(12) United States Patent
Shin et al.

(10) Patent No.: US 9,785,377 B2
(45) Date of Patent: Oct. 10, 2017

(54) TRACKING HOT AREAS OF DISK DRIVE

(71) Applicant: SEAGATE TECHNOLOGY LLC, Cupertino, CA (US)

(72) Inventors: Junghwan Shin, Gyeonggi-do (KR); Suhwan Kim, Gyeonggi-do (KR); Dong Hyuck Shin, Gyeonggi-do (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 17 days.

(21) Appl. No.: 14/533,891

(22) Filed: Nov. 5, 2014

(65) Prior Publication Data

US 2016/0124681 A1    May 5, 2016

(51) Int. Cl.
 *G06F 12/00* (2006.01)
 *G06F 3/06* (2006.01)
(52) U.S. Cl.
 CPC .......... *G06F 3/0653* (2013.01); *G06F 3/0604* (2013.01); *G06F 3/0674* (2013.01)
(58) Field of Classification Search
 CPC ....... G06F 3/0653; G06F 3/061; G06F 3/0676
 See application file for complete search history.

(56) References Cited

U.S. PATENT DOCUMENTS

| | | | |
|---|---|---|---|
| 8,489,937 B2 * | 7/2013 | Okada et al. | 714/42 |
| 8,621,134 B2 | 12/2013 | Ish | |
| 8,838,887 B1 | 9/2014 | Burke et al. | |
| 2009/0327577 A1 | 12/2009 | Fitzgerald | |
| 2014/0297909 A1 * | 10/2014 | Aiura | G06F 3/0608 710/74 |

* cited by examiner

*Primary Examiner* — David X Yi
*Assistant Examiner* — Alan Otto
(74) *Attorney, Agent, or Firm* — Holland & Hart LLP

(57) ABSTRACT

Methods, apparatuses, systems, and devices are described for determining use of areas of a disk drive. In one method, a score of an area node of the disk drive may be increased each time the area node is accessed during a time interval of a series of time intervals. When each time interval elapses, each existing score of the area nodes (e.g., scores of area nodes that have non-zero scores) may be decreased. Further, after being decreased, each existing score may be saved. In such a manner, a time series analysis of data accesses may be implemented. The increases in score may account for the number of accesses during a given interval, and the decreases in score may account for time passage (e.g., time-weighting the scores). Thus, more frequent accesses and more recent accesses result in higher accumulated scores for the corresponding area nodes.

20 Claims, 17 Drawing Sheets

TRACKING HOT AREAS OF DISK DRIVE

SUMMARY

The described features generally relate to one or more improved systems, methods, and/or apparatuses for tracking hot areas of a data storage drive. More particularly, the described features relate to techniques assessing use of data on a drive by identifying hot areas. In general, the techniques may take into account a time series analysis of data use on the drive.

The areas on the drive may be referred to as area nodes defined by a starting logical block address (LBA) and a length (e.g., number of blocks). In one example, each access to an area node during a time interval may cause an increase (e.g., an increment) in a score for that area node. At an end of the time interval, any existing score for each area node may be decreased (e.g., by multiplying by a factor less than one). The resulting scores for the area nodes may be evaluated to determine which of the area nodes may be hot areas.

For example, the resulting scores may be ordered from highest to lowest, and a certain number of area nodes having the highest scores may be identified as hot areas. Alternatively, or additionally, the scores of the area nodes may be compared with a threshold score to determine which are hot areas. Alternatively or additionally, the hot areas may be determined based on a desired or certain size (e.g., total number of blocks) of the area nodes to be considered hot areas.

A method of determining use of areas of a disk drive is also described. According to one implementation, the method may involve increasing a score of an area node of the disk drive each time the area node is accessed during a time interval of a series of time intervals. For each area node of the disk drive having an existing score, the existing score may be decreased based on an elapse of the time interval. The existing score of each area node may be saved at an end of the time interval.

In some examples, the method may involve determining at least one area node as a hot area of the disk drive based at least in part on the existing score of each area node at an end of one of the time intervals.

In some examples, the method may involve determining a certain number of area nodes having highest existing score(s) at an end of one of the time intervals as hot area(s) of the disk drive.

In some examples, decreasing the existing score may involve multiplying the existing score by a factor less than one.

In some examples, increasing the score of the area node may involve adding a predetermined base score to the score of the area node. In such examples, the method may involve determining that an area node that is accessed during the time interval overlaps with another area node that has an existing score. In such case, the method may involve splitting the area node having the existing score into an overlap area node corresponding to the overlap and at least one other area node (a non-overlap node). The score of the overlap area node may be the existing score plus the predetermined base score and the score of the at least one other area node may be the existing score. If a new area node includes an area node with an existing score, the new area node may be split with the new part getting the base score.

Alternatively, or additionally, the method may involve determining that an area node that is accessed during the time interval is adjacent to another area node that has an existing score. In such case, the method may involve merging the accessed area node with the area node having the existing score. The score of the merged area node may be the existing score.

In some examples, saving the existing score of each area node may involve saving the existing score of each area node in a table of candidate hot areas. In such examples, the method may involve determining at least one area node as a hot area of the disk drive based at least in part on the existing score of each area node in the table. The method further may involve determining a certain number of area nodes having highest existing score(s) in the table as hot area(s) of the disk drive, or determining hot areas based on a desired or certain size (e.g., total number of blocks) of the area nodes to be considered hot areas.

A computing device is described. According to one implementation, the computing device may include a data storage drive, a processor configured to access area nodes of the data storage drive, and an input/output device configured to cause the processor to access area nodes on the data storage drive. The processor may be configured to determine at least one hot area of the data storage drive based at least in part on existing scores for area nodes accessed by the processor. The processor may increase a score of an area node of the data storage drive each time the area node is accessed during a time interval of a series of time intervals and may decrease the score of the area node based on an elapse of the time interval. The computing device may include these and/or other elements configured to carry out various operations of the methods described above and herein.

An apparatus for determining use of areas of a disk drive is also described. According to one implementation, the apparatus may include a disk drive, a processor configured to access area nodes of the disk drive, and a timing device configured to determine a series of time intervals. The processor may be configured to determine access of the area nodes during a time interval of the series of time intervals. The processor may increase a score of an area node of the disk drive each time the area node is accessed and may decrease the score of the area node based on an elapse of the time interval. The apparatus may include these and/or other elements configured to carry out various operations of the methods described above and herein.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
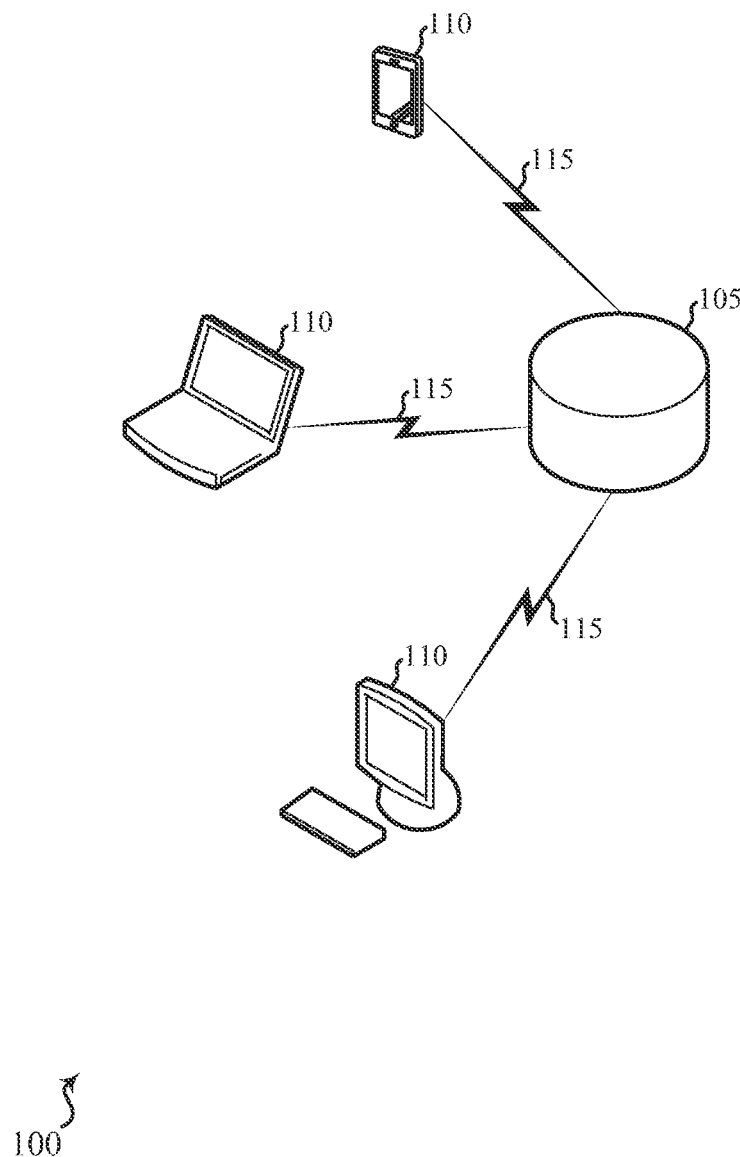
FIG. 1 is a block diagram of a computing system, in accordance with various embodiments.

The following relates generally to determining use of areas of a disk drive, and more specifically to determining hot areas in a manner that takes into account a time series of events.

Determining hot areas of a disk drive, or other storage device, may allow storage space on the drive to be allocated efficiently. Hot areas may be defined as area nodes of the disk drive (e.g., defined by starting LBA and length) that are frequently accessed. In some cases, a disk drive may be tiered or may include a cache. When tiered, different tiers may have different access speeds for accessing data stored thereon. Similarly, the cache of a disk drive may provide quicker access to data, as compared to a remainder of the disk drive. In such cases, frequently accessed data may be stored in the area(s) of the disk drive that provide quicker access to the data.

Frequent read accesses of data may indicate that the data is important or valuable. Employing a read buffer of the cache for area nodes that are determined as such to be hot areas may increase performance by holding the important or valuable data that is more likely to result in cache hits. Frequent write accesses of data may indicate that the data is temporary or is more subject to changes. Employing a write buffer of the cache for area nodes that are determined as such to be hot areas may decrease work amplification by holding the temporary data that may soon be replaced (e.g., avoid writing such data to more permanent storage of the disk drive each time the data is changed).

Therefore, determining use of areas (e.g., determining hot areas) of a disk drive is described. According to one implementation, a method of determining use of areas of a disk drive may involve increasing a score of an area node of the disk drive each time the area node is accessed during a time interval of a series of time intervals. For example, the score of an area node may be increased by a set amount or base score each time that area node is accessed during a time interval.

When each time interval elapses, each existing score of the area nodes (e.g., scores of area nodes that have non-zero scores) may be decreased. For example, each existing score may be multiplied by a factor less than one. Further, after being decreased, each existing score may be saved.

In such a manner, a time series analysis of data accesses may be implemented. The increases in score may account for the number of accesses during a given interval, and the decreases in score may account for time passage (e.g., time-weighting the scores). Thus, more frequent accesses and more recent accesses result in higher accumulated scores for the corresponding area nodes.

In some cases, the time intervals may be uniform in length and successive. Alternatively, the time intervals may vary in length and/or may be non-successive. In the case of time intervals of varying length, decreasing the existing scores at the end of each time interval may be based on the length of the respective time interval. For example, a predetermined length of time interval may have an associated predetermined factor, and a fraction of the predetermined factor may be used for time intervals longer than the predetermined length. Thus, the scores may be normalized, for example, based on working time (e.g., excluding idle time). The fraction may be selected to decrease the score based on the length of the time interval (e.g., proportional).

As described further herein, area node(s) may be determined to be hot area(s) using the scores saved at the end of any or all of the intervals. In some cases, determining hot areas may be performed periodically (e.g., after elapse of a certain number of time intervals) to use scores resulting from many accesses. Further, as appropriate or desired, the decreasing of scores at the end of a particular time interval may be omitted or skipped when the particular time interval does not have sufficient accesses (e.g., working time is small and idle time is large). For example, when no accesses occur in the particular time interval (e.g., entire time interval is idle time), applying a time-weight to the scores for that time interval may render discrimination of scores unnecessarily low. Thus, the decreasing may not be performed for the particular time interval.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram of a computing system 100 in accordance with various aspects of the present disclosure is shown. The computing system 100 may include a database or data storage device 105, such as a disk drive. The computing system 100 may be a distributed system in which multiple computing devices 110 may access data stored on the data storage device 105 and/or store (e.g., write) data on the data storage device 105. As such, the computing system 100 may be an enterprise system employing centralized data storage, or may be an example of unrelated computing devices 110 employing remote data storage (e.g., "the cloud").

Thus, each of the computing devices 110 may communicate, via a respective communication link 115, with the data storage device 105 to access data (e.g., read or write). The communication links 115 may be wireless (e.g., employing various radio access technologies), as appropriate or desired. Although wireless communication links 115 are illustrated in FIG. 1, it should be understood that wired communication links are possible as well.

Each of the computing devices 110 may be, for example, a laptop computer, a notebook computer, a netbook computer, a tablet computer, a smartphone, or the like. Thus, according to some aspects, the computing devices 110 may be portable or mobile. Additionally or alternatively, each of the computing devices 110 may be, for example, a desktop computer, a mainframe computer, or the like.

In accordance with one implementation, the data storage device 105 may be configured to identify or otherwise determine area nodes that are frequently accessed by the computing devices 110 (e.g., determine hot areas), such as described herein. The data storage device 105 may determine hot areas for the computing devices 110 collectively, such as in an enterprise system, or may determine hot areas for each of the computing devices 110 individually. When determined individually, the data storage device 105 may have dedicated portions, caches or portions of a cache for each of the respective computing devices 110. As such, the hot areas respectively determined for the individual computing devices 110 may be used to determine what data to store in the respective dedicated portions, such as described herein.

Figure 2:
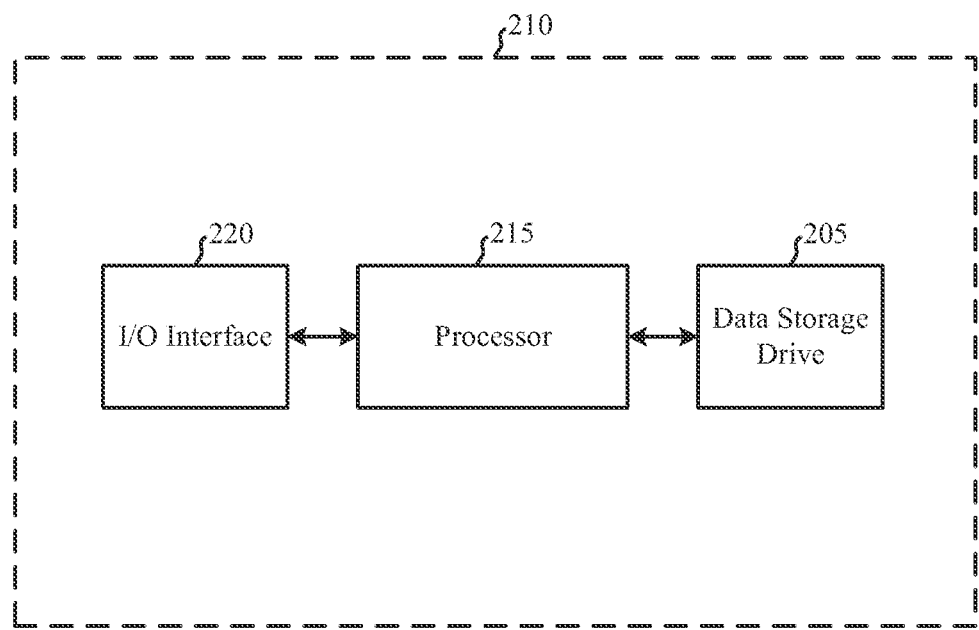
FIG. 2 is a block diagram of a computing device, in accordance with various embodiments.

FIG. 2 shows a block diagram that illustrates an example of computing device 210, in accordance with various aspects of the present disclosure. The computing device 210 may be an example of the computing devices 110 described above with respect to FIG. 1, for example. According to this example, the computing device 210 may include a data storage drive 205, such as a disk drive. The computing device 210 also may include a processor 215 configured to access (e.g., read/write) data on the data storage drive 205. The computing device 210 further may include an input/output (I/O) interface 220, such as a keyboard, a mouse, a touchscreen, or the like, that is configured to cause the processor 215 to access data on the data storage drive 205. It should be understood, however, that some instances of data access may be performed by the processor 215 without receiving a command from the I/O interface 220.

In the example of FIG. 2, the processor 215 and/or the data storage drive 205 may be configured to identify or otherwise determine area nodes that are frequently accessed by the processor 215 (e.g., determine hot areas), such as described herein. As described further herein, the determined hot areas may be used to determine what data to store in different portions (e.g., having different access speeds) of the data storage drive 205.

Figure 3:
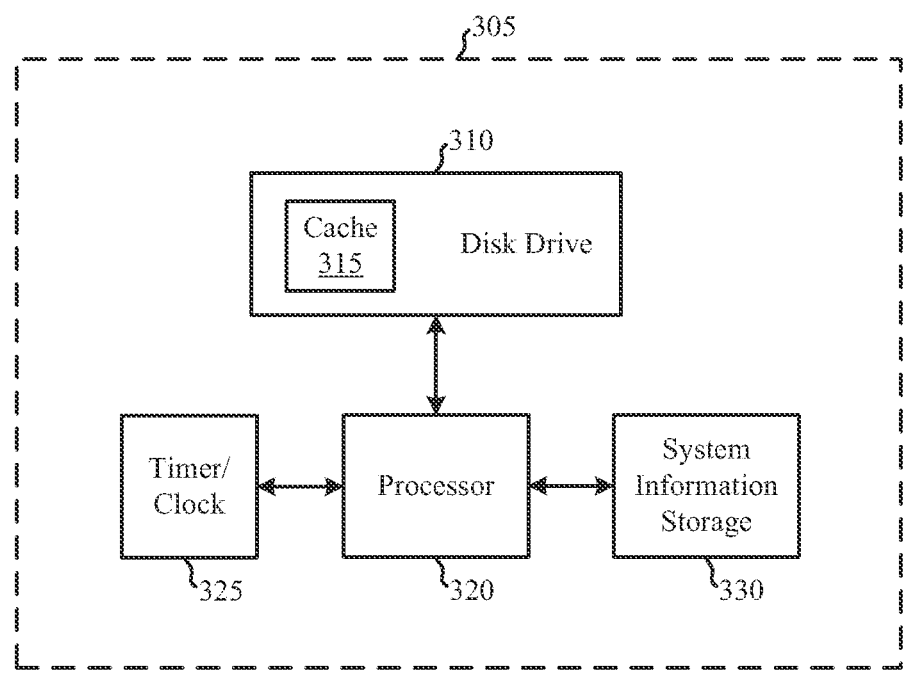
FIG. 3 is a block diagram of a data storage device, in accordance with various embodiments.

FIG. 3 shows a block diagram that illustrates an example of a data storage device 305, in accordance with various aspects of the present disclosure. The data storage device 305 may be an example of the data storage device 105 described above with respect to FIG. 1 or the data storage drive 205 described above with respect to FIG. 2, for example.

The data storage device 305 may include a disk drive 310. According to this example, the disk drive 310 may include a cache 315. The data storage device 305 also may include a processor 320, a timer or clock 325 and a system information storage 330.

Data on the data storage device 305 (e.g., on the disk drive 310) may be accessed (e.g., read/written) by a processor of a computing device (not shown). The data may be accessed via communication with the processor 320 of the data storage device 305, or directly from/to the disk drive 310. In either case, accesses of data on the disk drive 310 may be tracked by the processor 320 to determine hot areas (e.g., frequently accessed area nodes) of the disk drive 310, such as described herein.

In some examples, the processor 320 may be configured to track accesses of area nodes based on time intervals using the timer/clock 325. As described herein, the timer/clock 325 may be used to determine a series of time intervals. During each time interval, the processor 320 may track accesses of data according to the area nodes of the disk drive 310. The processor 320 may implement a time-weighted scoring technique to allow the area nodes to be evaluated for hot areas.

The processor 320 may increase a score of an area node each time that area node is accessed during a given time interval. For example, an existing score of the accessed area node may be increased by a predetermined or base score. Of course, there may not be an existing score for the accessed area node (e.g., the area node was not previously accessed or the score of the area node was dropped (such as from a table of limited space, or the prior score was too low to matter)). In such case, the score of the accessed area node may be set to the base score, with the score being increased by the base score for each subsequent access of that area node during the given time interval.

At an end of the given time interval, the processor 320 may decrease the existing score of each area node. For example, each existing score may be decremented by a predetermined value, or may be decrease by multiplying the score by a predetermined factor. The value or factor may be predetermined or fixed, for example, for time intervals of uniform length. Alternatively, the value or factor may vary based on a length of the given time interval.

Also at the end of the given time interval, the processor 320 may save each existing score for the respective area node(s) in the system information storage 330. Although the system information storage 330 is shown as a separate component, it should be understood that the system information storage 330 may be implemented as part of the disk drive 310 as well.

Saving the scores for area nodes in the system information storage 330 makes the scores available for the next time interval to provide cumulative scoring. This also may make the scores available after the data storage device 305 is turned off and restarted. Thus, the existing scores may be available upon boot up of the data storage device 305 to continue tracking of hot areas even when the data storage device has not been in use (e.g., powered off) for some time.

It should be understood that the various features described above with respect to FIGS. 1, 2 and/or 3 may be combined to achieve other configurations as well. Thus, the examples described above are intended to be illustrative and not exhaustive.

The components of the computing device 210 described with respect to FIG. 2 and those of the data storage device 305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the processor 215 may be a central processing unit (CPU) of the computing device 210. The processor 215 may be configured to control or otherwise cooperate with the data storage drive 205 and the I/O interface 220 to carry out various operations of the computing device 210 in connection with the data access tracking features described herein. The processor 215 may also be configured to carry out other functions of the computing device 210 by controlling these and/or other components that may be included in the computing device 210 according to its design.

Figure 4:
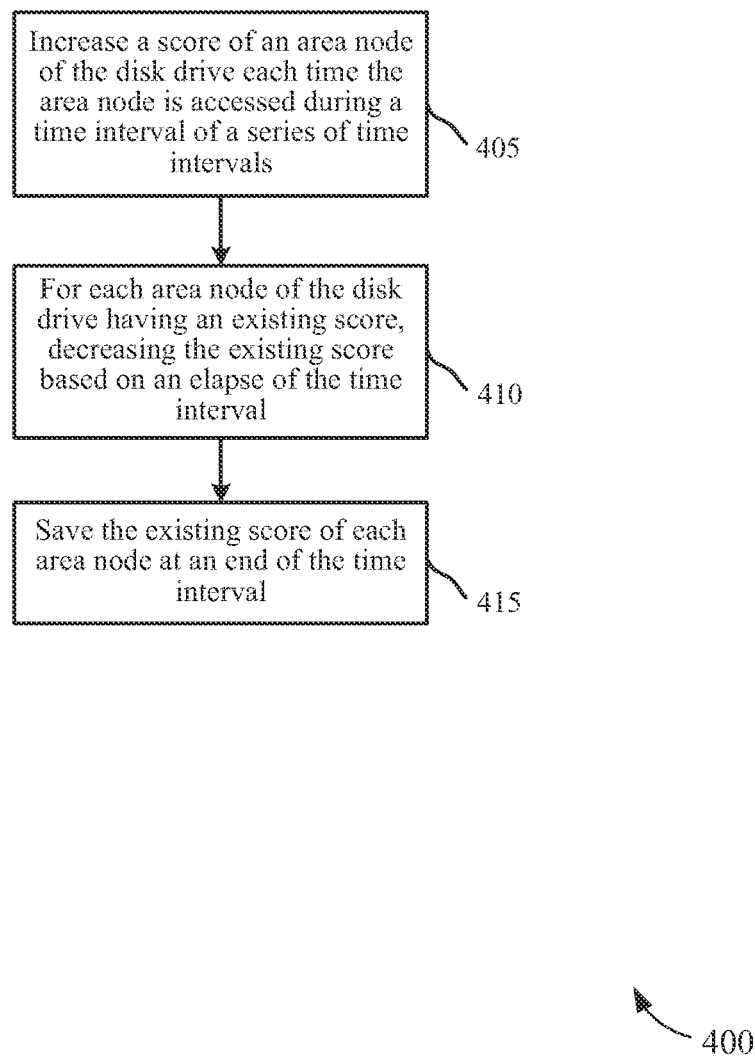
FIG. 4 is a flowchart illustrating an example of a method of determining use of areas of a disk drive, in accordance with various embodiments.

FIG. 4 is a flowchart illustrating an example of a method 400 of determining use of areas of a disk drive, in accordance with various aspects of the present disclosure. For clarity, the method 400 is described below with reference to aspects of the computing system 100 described with reference to FIG. 1, and/or the computing device 210 described with reference to FIG. 2, and/or the data storage device 305 described with reference to FIG. 3. In some implementations, a processor of such may execute one or more sets of codes to control the functional elements of the computing device and/or the data storage device/drive to perform the functions described below.

At block 405, a score of an area node of the disk drive (or data storage device) may be increased each time the area node is accessed during a time interval of a series of time intervals. Thus, each data access during the time interval is taken into account. For each area node of the disk drive having an existing score, at block 410, the existing score is decreased based on an elapse of the time interval (e.g., at an end of the time interval). Thus, each existing score is time-weighted to take into account how recently (e.g., within which time interval) the data accesses occurred. A length for the individual time intervals may be selected (e.g., set) to determine how the decrease represents or accounts for the recentness of each data access. As noted above, idle time within a particular time interval may be taken into account by adjusting the decreasing factor appropriately.

At block 415, the existing score of each area node may be saved at the end of the time interval. As described herein, the saved scores may be used to determine hot areas at the end of the time interval. The saved scores also may allow cumulative scoring over a plurality of the time intervals, with hot area assessment being performed at the end of any or all of the time intervals.

Figure 5:
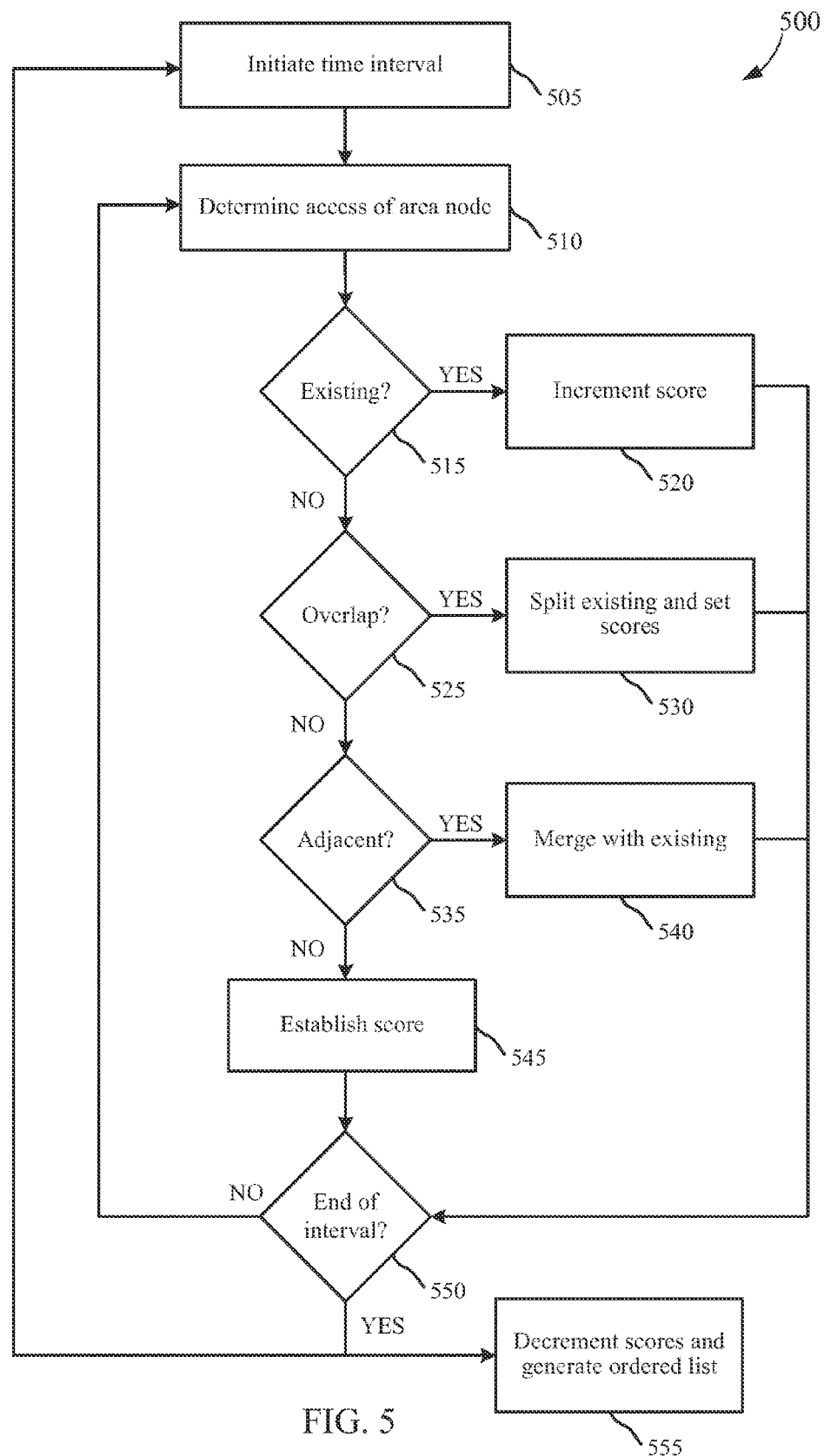
FIG. 5 is a flowchart illustrating another example of a method of determining use of areas of a disk drive, in accordance with various embodiments.

FIG. 5 is a flowchart illustrating another example of a method 500 of determining use of areas of a disk drive, in accordance with various aspects of the present disclosure. For clarity, the method 500 is described below with reference to aspects of the computing system 100 described with reference to FIG. 1, and/or the computing device 210 described with reference to FIG. 2, and/or the data storage device 305 described with reference to FIG. 3. In some implementations, a processor of such may execute one or more sets of codes to control the functional elements of the computing device and/or the data storage device/drive to perform the functions described below.

At block 505, a time interval may be initiated, for example, using the timer/clock 325 of the data storage device 305, or using an internal timer or clock (not shown) of the computing device 210 or of one of the computing devices 110.

At block 510, a data access of an area node may be determined. Then, at block 515, whether a score for the accessed area node exists may be determined. The existing score may be for the exact (e.g., hit) area node (e.g., by LBA and length). If so, the method may proceed to block 520, where the existing score for the accessed area node may be increased (e.g., incremented by a base score). The method may then jump to block 550, where whether the time interval has elapsed or ended may be determined. If so, the method may continue to block 555, where all existing scores for area nodes are decreased (e.g., decremented or multiplied by a factor less than one) and an ordered list (e.g., based on scores) may be generated. Also, upon elapse of the time interval, the method may return to block 505 for initiation of the next time interval. Otherwise, if the time interval has not ended, the method may return to block 510.

Although not illustrated, an operation of monitoring for data accesses may occur before block 510. Further, another instance of determining whether the time interval has elapsed/ended may occur so that the method may reach block 555 even if no (further) data access is determined at block 510. Such features are not shown for the sake of simplicity and clarity of the flowchart.

If no existing score for the accessed area node is determined at block 515, the method may jump to block 525, where whether the accessed area node overlaps with an area node having an existing score is determined. If so, then the method may proceed to block 530, where the area node with the existing score may be split into multiple area nodes with separate scores, the score of the overlapping area node being increased (e.g., incremented) and the existing score being maintained for the split area node(s). Examples of such splitting are described further below. The method may then jump to block 550 and so on, such as described above.

If no overlap is determined to exist between the accessed area node and an area node having an existing score at block 525, the method may jump to block 535, where whether the accessed area node is adjacent to an area node having an existing score is determined. If so, then the method may proceed to block 540, where the accessed area node may be merged with the area node having the existing score, with the existing score being maintained for the merged area node. An examples of such merging is described further below. The method may then jump to block 550 and so on, such as described above.

If the accessed area node is determined not to be adjacent to an area node having an existing score at block 535, the method may jump to block 545, where a score may be established for the accessed area node (e.g., base score as described herein). Then the method may continue to block 550 and so on, such as described above.

Figure 6A:
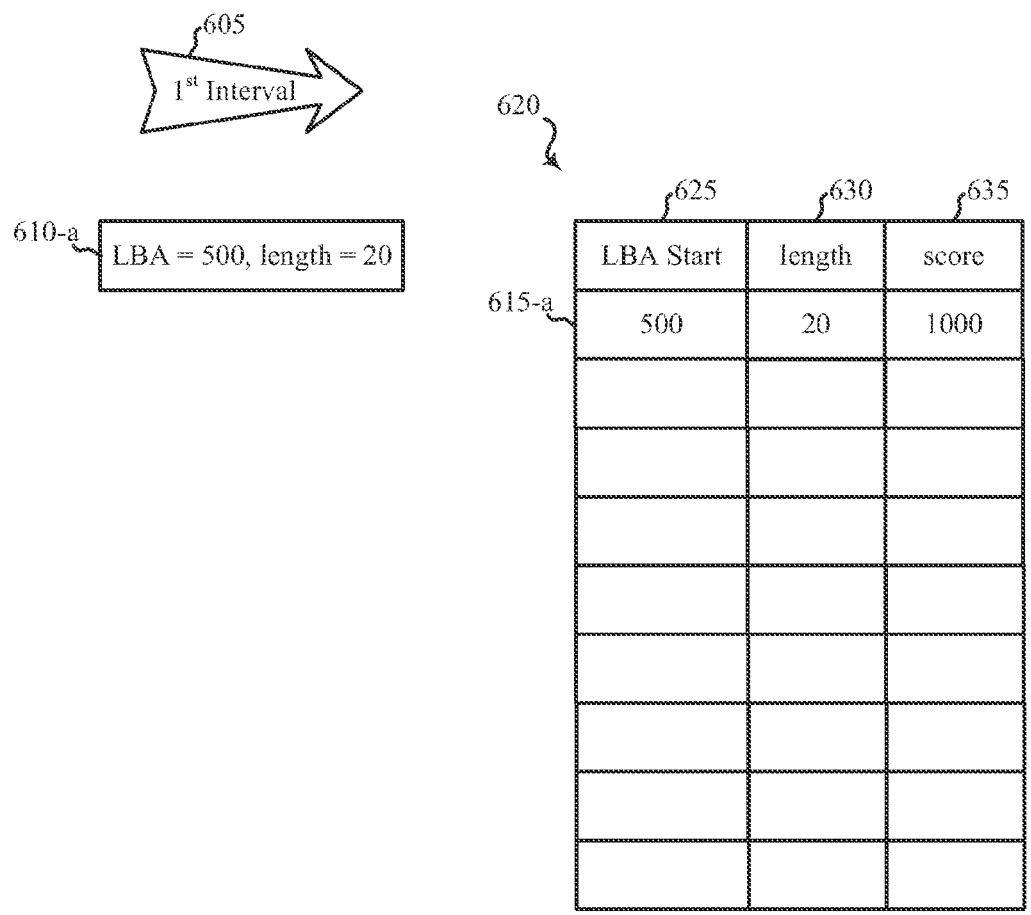
FIGS. 6A-6L are a series of diagrams illustrating an example of scoring and determining hot areas, in accordance with various embodiments.

An example of an implementation of a scoring algorithm and determining hot areas, in accordance with various aspects of the present disclosure, is illustrated by the series of diagrams in FIGS. 6A-6L. Turning first to FIG. 6A, actions occurring within a first time interval 605 are illustrated. A host command or first data access 610-*a* may occur for an area node with an LBA of 500 and a length of 20. As this area node does not have an existing score, a first entry 615-*a* may be added to a first table 620 of hot area candidates. The first table 620 (candidate score table) may include fields 625 and 630 identifying the accessed area node by the starting LBA and the length, respectively. Further, the table may include a field 635 for a score of the candidate area nodes. In this example, the score of the area node corresponding to the first data access 610-*a* is set to a base score of 1000.

Figure 6B:
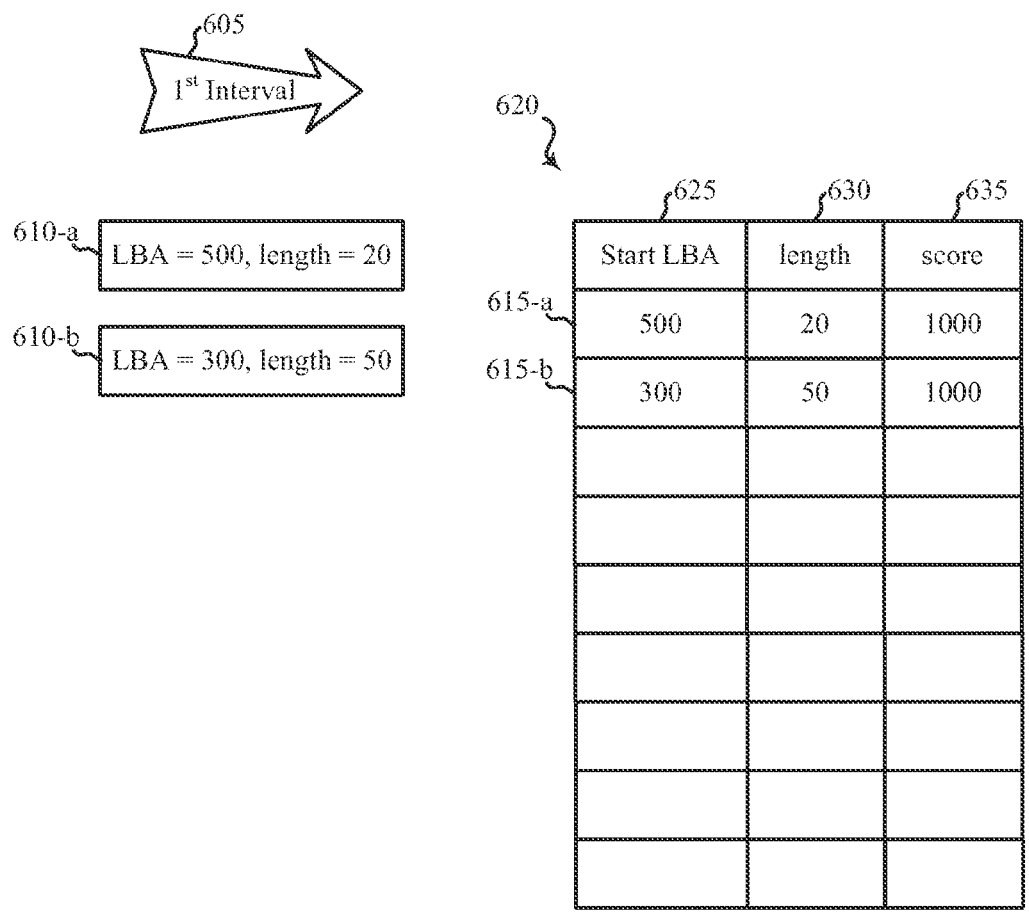

FIG. 6B illustrates further actions occurring within the first time interval 605. Another host command or second data access 610-*b* may occur for an area node with an LBA of 300 and a length of 50. As this area node does not have an existing score, a second entry 615-*b* may be added to the first table 620 of hot area candidates. The score of the area node corresponding to the second data access 610-*a* may be set to the base score of 1000.

Figure 6C:
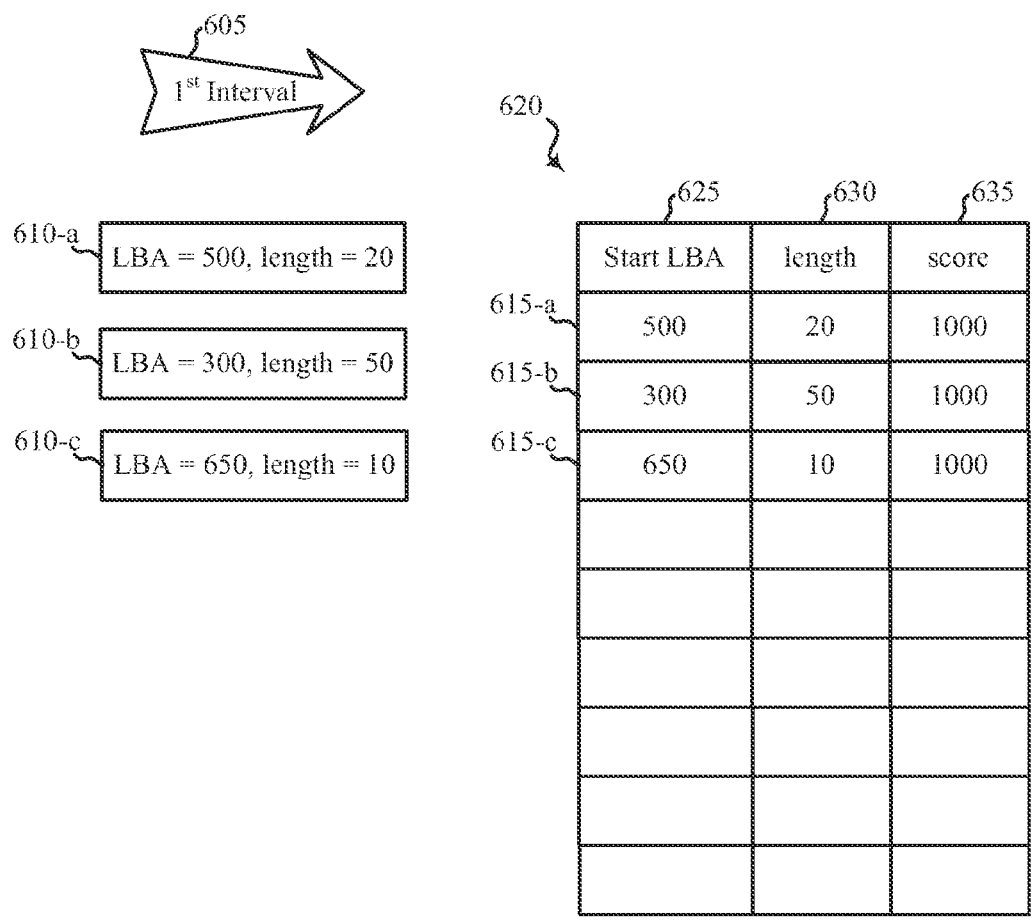

FIG. 6C illustrates further actions occurring within the first time interval 605. A third data access 610-*c* may occur for an area node with an LBA of 650 and a length of 10. As this area node does not have an existing score, a third entry 615-*c* may be added to the first table 620. The score of the area node corresponding to the third data access 610-*c* also may be set to the base score of 1000.

Figure 6D:
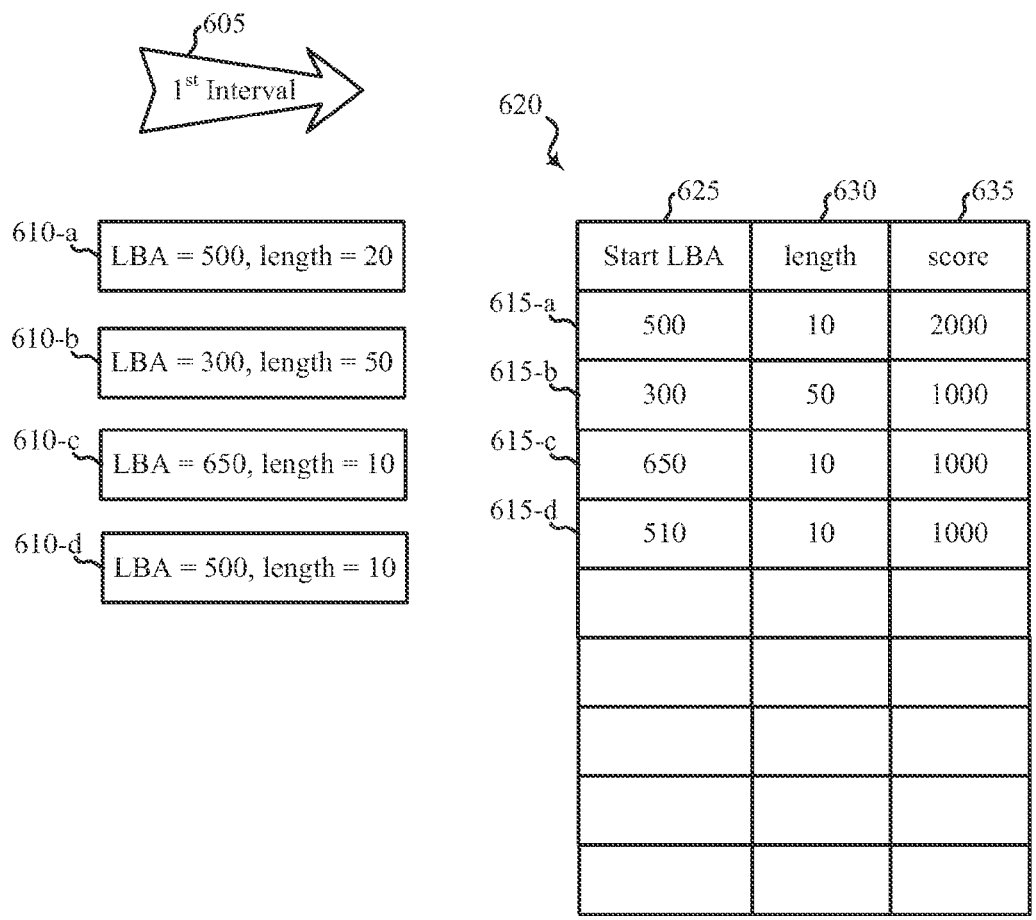

FIG. 6D illustrates further actions occurring within the first time interval 605. A fourth data access 610-*d* may occur for an area node with an LBA of 500 and a length of 10. As this area node overlaps with the area node of entry 615-*a* shown in FIG. 6C (LBA 500, length 20, score 1000), the area node of entry 615-*a* may be split into two entries, namely an entry (modified entry 615-*a*) corresponding to the overlap and a fourth entry 615-*d* corresponding to a remainder of the area node of the fourth data access 610-*d*. The score of the entry 615-*a* corresponding to the overlap may be increased to 2000, for example, by adding the base score to the previously existing score. The score of the fourth entry 615-*d* may be set to the existing score of the prior entry 615-*a*, 1000. Although not illustrated by this example, if a new area node includes an area node with an existing score, the new area node may be split with the new part getting the base score, and the old part getting the existing score plus the base score.

Figure 6E:
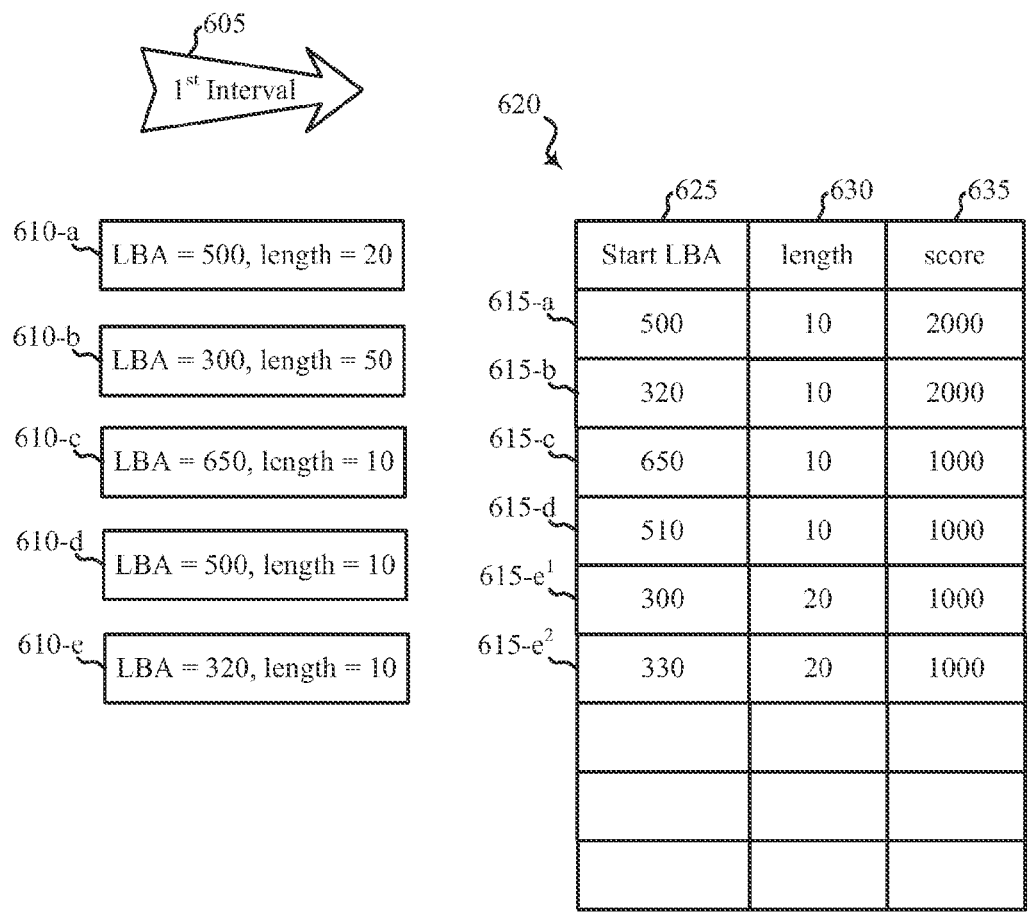

FIG. 6E illustrates further actions occurring within the first time interval 605. A fifth data access 610-*e* may occur for an area node with an LBA of 320 and a length of 10. As this area node overlaps with the area node of entry 615-*b* shown in FIG. 6D (LBA 300, length 50, score 1000), the area node of entry 615-*b* may be split into three entries, namely an entry (modified entry 615-*b*) corresponding to the overlap and fifth and sixth entries 615-$e^1$ and 615-$e^2$ corresponding to a remainder of the area node of the second data access 610-*b*. The score of the entry 615-*b* corresponding to the overlap may be increased to 2000, for example, by adding the base score to the previously existing score. The score of the fifth and sixth entries 615-$e^1$ and 615-$e^2$ both may be set to the previously existing score of entry 615-*b*, 1000.

Figure 6F:
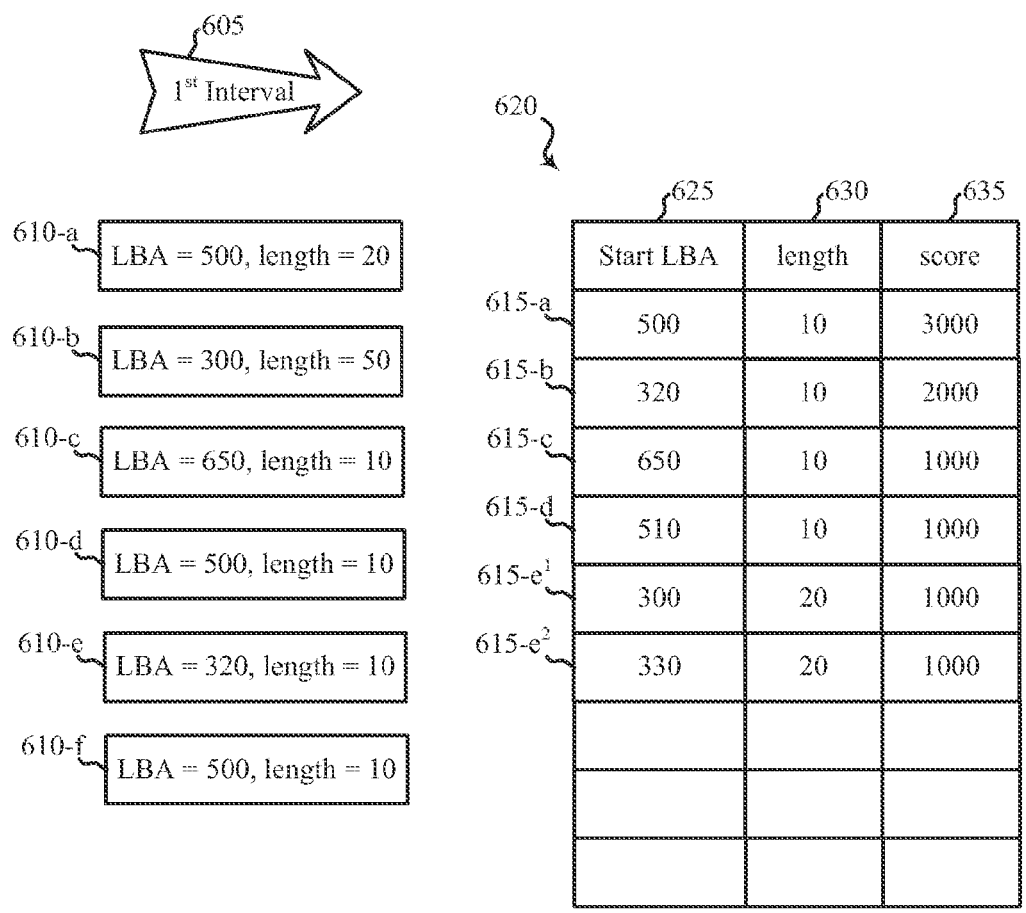

FIG. 6F illustrates further actions occurring within the first time interval 605. A sixth data access 610-*f* may occur for an area node with an LBA of 500 and a length of 10. As a score for this area node exists (e.g., an exact match or hit) in entry 615-*a* shown in FIG. 6E (LBA 500, length 10, score 2000), the score of entry 615-*a* may be increased to 3000, for example, by adding the base score to the previously existing score.

Figure 6G:
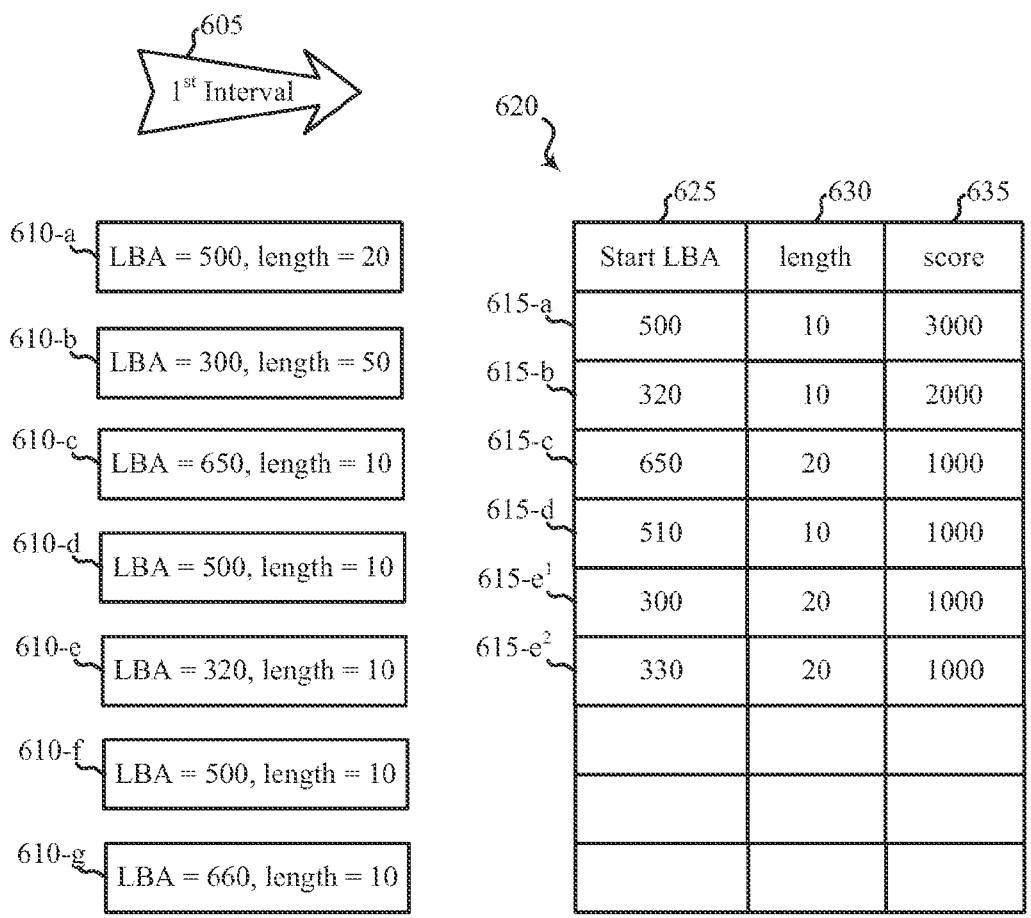

FIG. 6G illustrates further actions occurring within the first time interval 605. A seventh data access 610-*g* may occur for an area node with an LBA of 660 and a length of 10. As this area node is adjacent to the area node of entry 615-*c* shown in FIG. 6F (LBA 650, length 10, score 1000), the area node of entry 615-*c* may be merged or combined with this newly accessed area node to modify the entry 615-*c* as shown in FIG. 6G. As the merged/combined area node corresponding to the modified entry 615-*c* has been accessed only once, the score of entry 615-*c* may be maintained at 1000.

Figure 6H:
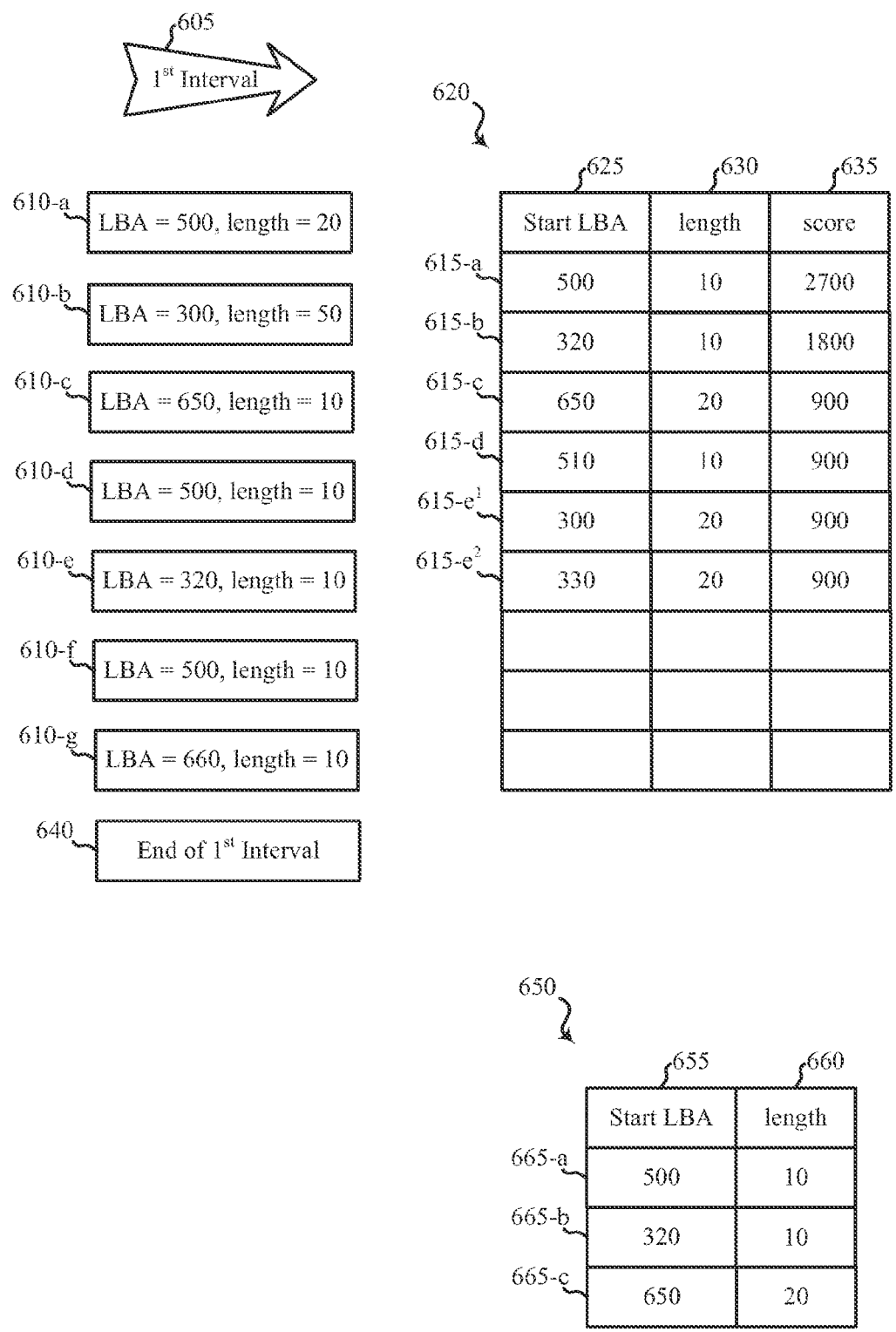

FIG. 6H illustrates further actions occurring for the first time interval 605. A host command or first indication 640 of an elapse or end of the first time interval may occur. At this time, the existing scores of the entries in the first table 620 may be decreased. In this example, the existing scores are decreased by multiplication with a factor or 0.9. Thus, the existing score of 3000 of the entry 615-*a* shown in FIG. 6G is decreased to 2700 as shown in FIG. 6H, the existing score of 2000 of the entry 615-*b* shown in FIG. 6G is decreased to 1800 as shown in FIG. 6H, and so on.

Optionally, hot areas of the disk drive may be assessed or determined based on the existing scores at the end of the first time interval 605. As illustrated in FIG. 6H, hot areas may be determined via and ordered list or second table 650. The second table 650 may include fields 655 and 660 identifying the hot area nodes by starting LBA and length, respectively. In this example, a first hot area 665-*a* (LBA 500, length 10) has a score of 2700 in the first table 620. A second hot area 665-*b* (LBA 320, length 10) has a score of 1800 in the first table 620, and a third hot area 665-*c* (LBA 650, length 10) has a score of 900.

The hot areas may be determined based on a desired or certain number of area nodes to be considered hot areas, three in the example of FIG. 6H. As multiple area nodes have a same score of 900, the third hot area 665-*c* may be determined to be a hot area in any suitable manner. For example, the third hot area 665-*c* may be determined based on the data structure of the first table 620—the third hot area 665-*c* being selected as being found first in the first table 620. Alternatively or additionally, the third hot area 665-*c* may be determined based on the recentness of the corresponding seventh data access 610-*g* shown in FIG. 6G. Alternatively, the third hot area 665-*c* may be determined randomly from the area nodes with equal scores. However, if an index of the table 620 is based on the start LBA, then area node 615-$e^1$ may be determined to be the third hot area.

The hot areas also may be determined based on a desired or certain size (e.g., total number of blocks) of the area nodes to be considered hot areas. For example, if a cache is to be partially filled up to a certain limit with important or valuable data (e.g., corresponding to hot areas), then the hot areas may be determined to fit within that limit or threshold. In the example of FIG. 6H, the limit may be 40 blocks of data, such that only the data blocks of hot areas 665-*a*, 665-*b* and 665-*c* with fit within the limit.

Figure 6I:
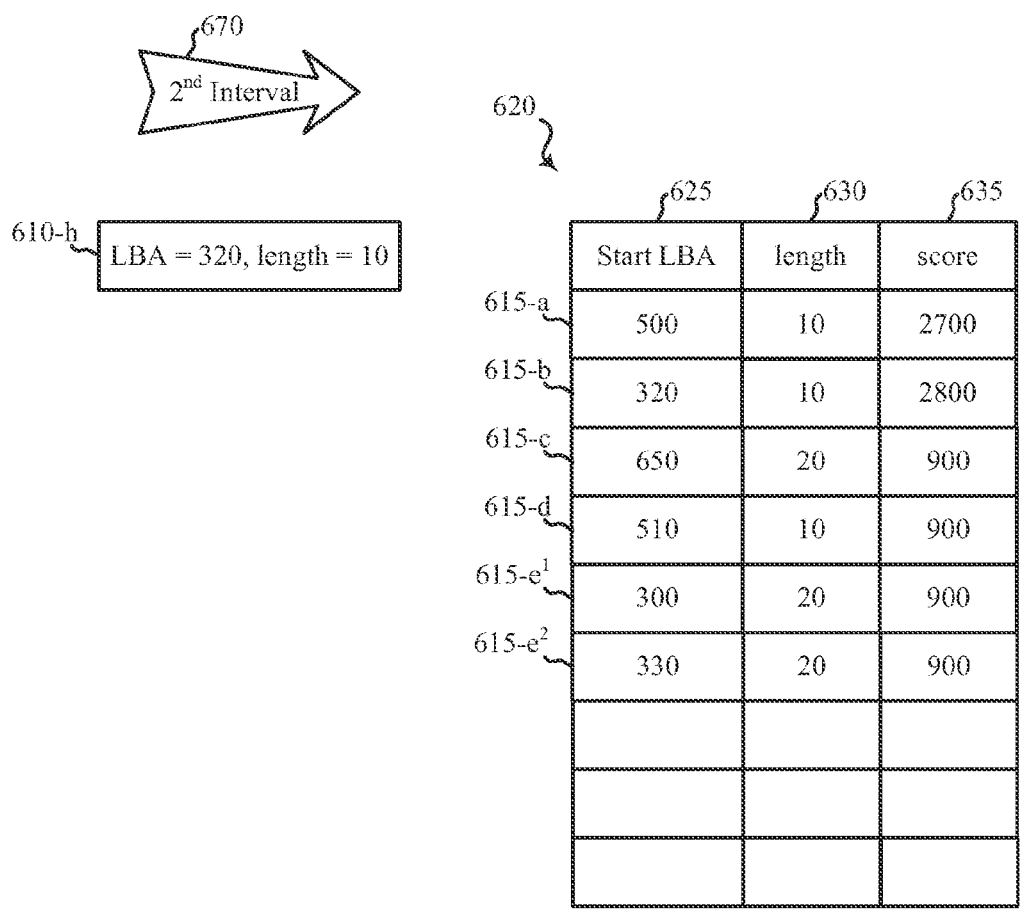

FIG. 6I illustrates actions occurring within a second time interval 670, subsequent to the first time interval 605. The entries of the first table 620 may be maintained from the end of the first interval after decreasing the scores accordingly. An eighth data access 610-*h* may occur for an area node with an LBA of 320 and a length of 10. As a score for this area node exists in entry 615-*b* shown in FIG. 6H (LBA 320, length 10, score 1800), the score of entry 615-*b* may be increased to 2800, for example, by adding the base score to the previously existing score.

Figure 6J:
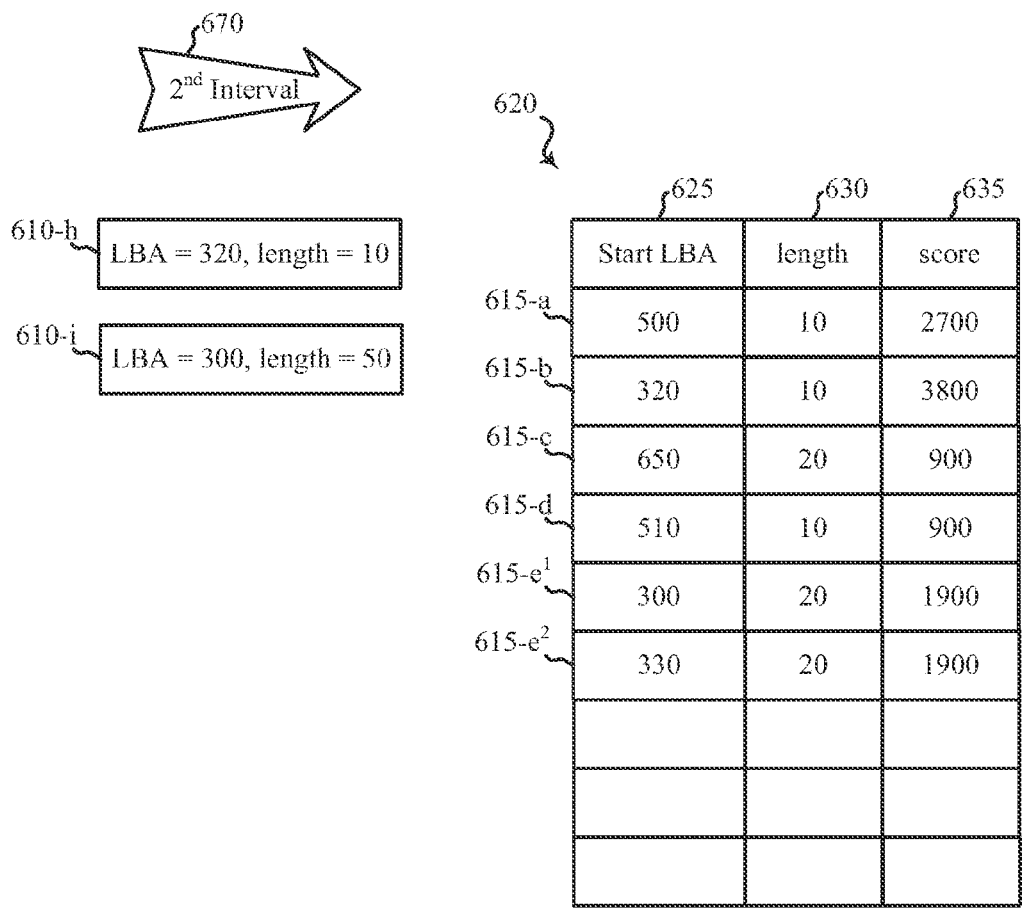

FIG. 6J illustrates further actions occurring within the second time interval 670. A ninth data access 610-*i* may occur for an area node with an LBA of 300 and a length of 50. As this area node overlaps entirely with entries 615-*b*, 615-$e^1$ and 615-$e^2$ shown in FIG. 6H (LBA 320, length 10, score 2800; LBA 300, length 20, score 900; and, LBA 330, length 20, score 900), the scores of each of these entries 615-*b*-*b*, 615-$e^1$ and 615-$e^2$ may be increased to 3800, 1900 and 1900, respectively, by adding the base score to the previously existing scores.

Figure 6K:
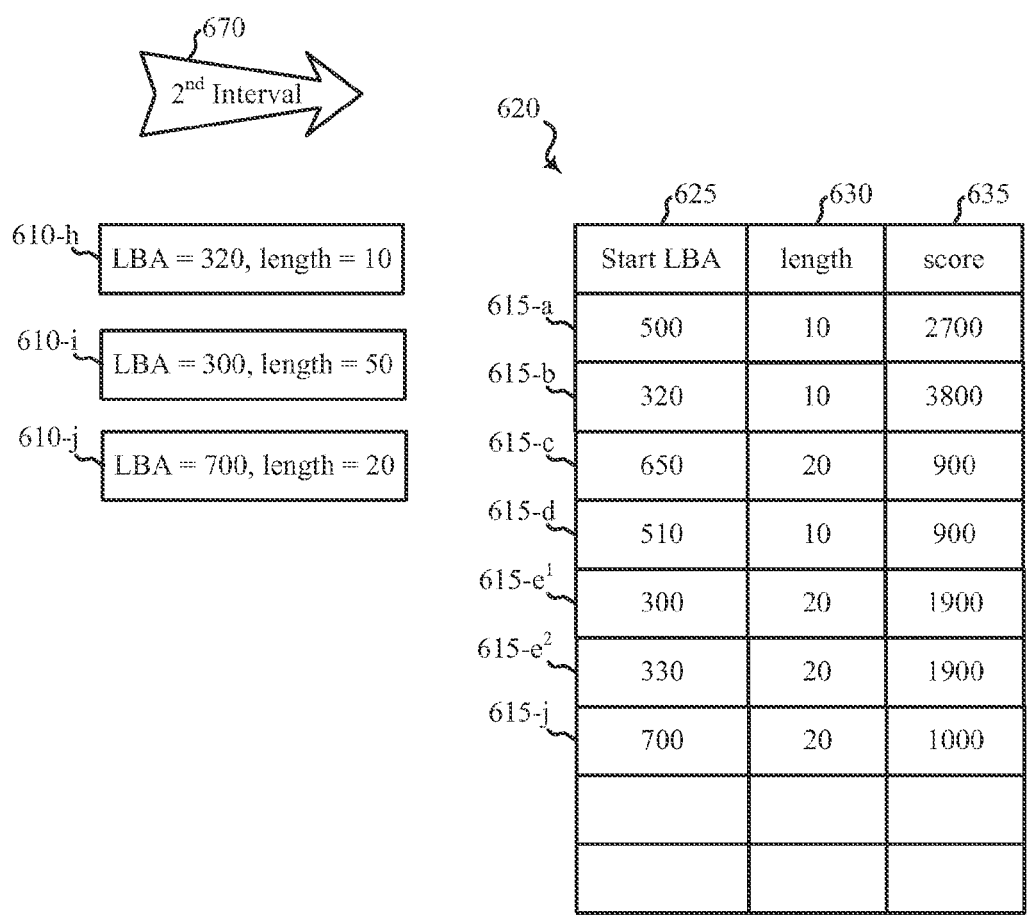

FIG. 6K illustrates further actions occurring within the second time interval 670. A tenth data access 610-*j* may occur for an area node with an LBA of 700 and a length of 20. As this area node does not have an existing score, a seventh entry 615-*j* may be added to the first table 620. The score of the area node corresponding to the tenth data access 610-*j* may be set to the base score of 1000.

Figure 6L:
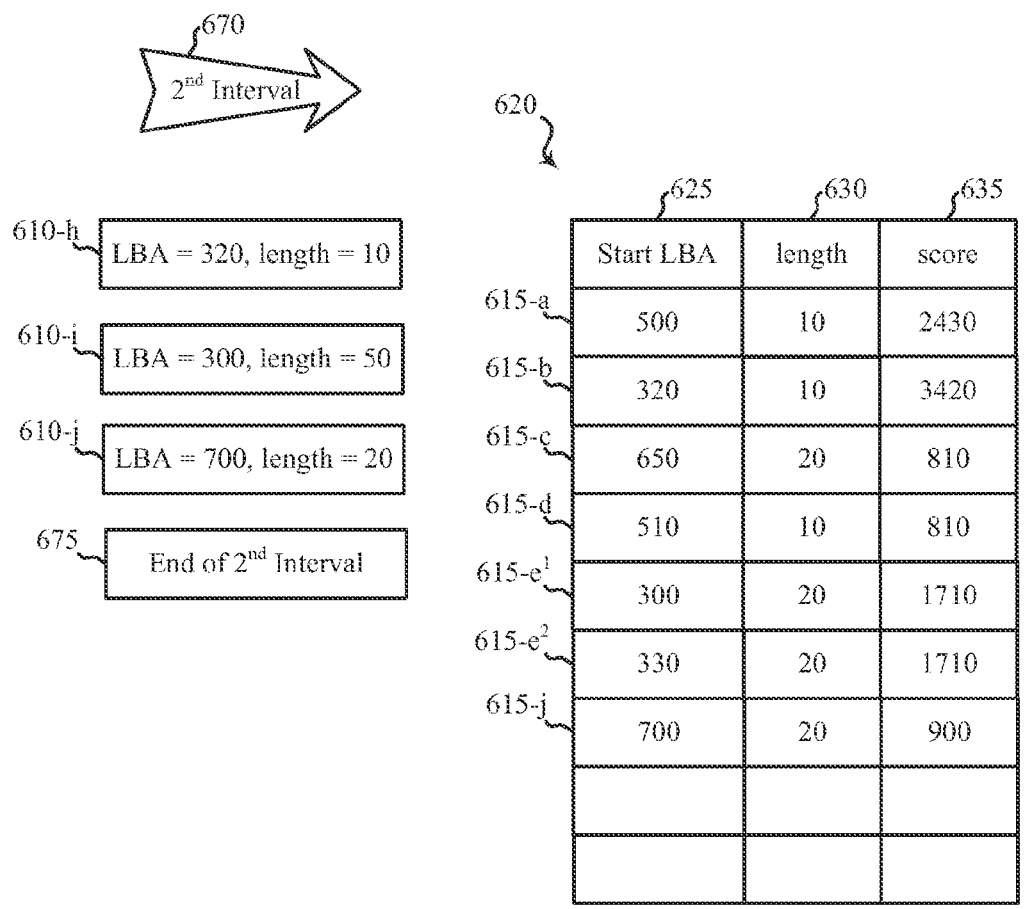

FIG. 6L illustrates further actions occurring for the second time interval 670. A host command or second indication 675 of an elapse or end of the second time interval may occur. At this time, the existing scores of the entries in the first table 620 may be decreased. In this example, the existing scores are decreased by multiplication with a factor or 0.9. Thus, the existing score of 2700 of the entry 615-*a* shown in FIG. 6K is decreased to 2430 as shown in FIG. 6L, the existing score of 3800 of the entry 615-*b* shown in FIG. 6K is decreased to 3420 as shown in FIG. 6L, and so on. As discussed above, hot areas of the disk drive may be assessed or determined based on the existing scores at the end of the second time interval 670, whether or not hot areas are determined at the end of the first time interval 605.

The foregoing description of the implementation of a scoring algorithm and determining hot areas illustrated by the series of diagrams in FIGS. 6A-6L may be for data accesses that are read only. A separate implementation may be employed for data accesses that are write only. As discussed above, tracking hot areas for each type of data accesses may provide useful information for data storage operations.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of determining use of areas of a disk drive, comprising:
    increasing a score of an area node of the disk drive each time the area node is accessed during a time interval of a series of time intervals;
    determining whether the number of accesses during the time interval satisfies an access threshold;
    for each area node of the disk drive satisfying the access threshold and having an existing score that is non-zero before the time interval, decreasing the existing score based on an elapse of the time interval;
    for each area node of the disk drive that fails to satisfy the access threshold or has an existing score that is zero before the time interval, bypassing a decreasing of the existing score; and
    saving the existing score of each area node at an end of the time interval.

2. The method of claim 1, further comprising:
    determining at least one area node as a hot area of the disk drive based at least in part on the existing score of each area node at an end of one of the time intervals, wherein the existing score is decreased by an amount based on a length of the time interval.

3. The method of claim 1, further comprising:
    determining a certain number of area nodes having highest existing score(s) at an end of one of the time intervals as hot area(s) of the disk drive.

4. The method of claim 1, wherein decreasing the existing score comprises:
multiplying the existing score by a factor less than one.

5. The method of claim 1, wherein increasing the score of the area node comprises:
adding a predetermined base score to the score of the area node.

6. The method of claim 5, further comprising:
determining that an area node that is accessed during the time interval has an overlap with another area node that has an existing score; and
splitting the area node having the existing score into an overlap area node corresponding to the overlap and at least one other area node, the score of the overlap area node being the existing score plus the predetermined base score and the score of the at least one other area node being the existing score.

7. The method of claim 5, further comprising:
determining that an area node that is accessed during the time interval is adjacent to another area node that has an existing score; and
merging the accessed area node with the area node having the existing score, the score of the merged area node being the existing score.

8. The method of claim 1, wherein saving the existing score of each area node comprises:
saving the existing score of each area node in a table of candidate hot areas.

9. The method of claim 8, further comprising:
determining at least one area node as a hot area of the disk drive based at least in part on the existing score of each area node in the table of candidate hot areas.

10. The method of claim 8, further comprising:
determining a certain number of area nodes having highest existing score(s) in the table of candidate hot areas as hot area(s) of the disk drive.

11. A computing device, comprising:
a data storage drive;
a processor configured to access area nodes of the data storage drive; and
an input/output device configured to cause the processor to access area nodes on the data storage drive, wherein the processor is configured to:
determine at least one hot area of the data storage drive based at least in part on existing scores for area nodes accessed by the processor;
increase a score of an area node of the data storage drive each time the area node is accessed during a time interval of a series of time intervals;
determine whether the number of accesses during the time interval satisfies an access threshold;
for each area node of the disk drive satisfying the access threshold and having an existing score that is non-zero before the time interval, decrease the existing score of the associated area node based on an elapse of the time interval; and
for each area node of the disk drive that fails to satisfy the access threshold or has an existing score that is zero before the time interval, bypass decreasing the existing score.

12. The computing device of claim 11, wherein the processor decreases the score by multiplying an existing score by a factor less than one.

13. The computing device of claim 11, wherein the processor increases the score of the area node by adding a predetermined base score to the score of the area node.

14. The computing device of claim 13, wherein, when an area node that is accessed during the time interval has an overlap with another area node that has an existing score, the processor splits the area node having the existing score into an overlap area node corresponding to the overlap and at least one other area node, the score of the overlap area node being the existing score plus the predetermined base score and the score of the at least one other area node being the existing score.

15. The computing device of claim 13, wherein, when an area node that is accessed during the time interval is adjacent to another area node that has an existing score, the processor merges the accessed area node with the area node having the existing score, the score of the merged area node being the existing score.

16. An apparatus for determining use of areas of a data storage device, comprising:
a disk drive;
a processor configured to access area nodes of the disk drive; and
a timing device configured to determine a series of time intervals, wherein the processor is configured to:
determine access of the area nodes during a time interval of the series of time intervals;
increase a score of an area node of the data storage drive each time the area node is accessed during a time interval of a series of time intervals;
determine whether the number of accesses during the time interval satisfies an access threshold;
for each area node of the disk drive satisfying the access threshold and having an existing score that is non-zero before the time interval, decrease the existing score of the associated area node based on an elapse of the time interval; and
for each area node of the disk drive that fails to satisfy the access threshold or has an existing score that is zero before the time interval, bypass decreasing the existing score.

17. The apparatus of claim 16, wherein the processor decreases the score by multiplying an existing score by a factor less than one.

18. The apparatus of claim 16, wherein the processor increases the score of the area node by adding a predetermined base score to the score of the area node.

19. The apparatus of claim 18, wherein, when an area node that is accessed during the time interval has an overlap with another area node that has an existing score, the processor splits the area node having the existing score into an overlap area node corresponding to the overlap and at least one other area node, the score of the overlap area node being the existing score plus the predetermined base score and the score of the at least one other area node being the existing score.

20. The apparatus of claim 18, wherein, when an area node that is accessed during the time interval is adjacent to another area node that has an existing score, the processor merges the accessed area node with the area node having the existing score, the score of the merged area node being the existing score.

* * * * *